(12) United States Patent
Lim et al.

(10) Patent No.: US 12,218,309 B2
(45) Date of Patent: Feb. 4, 2025

(54) ELECTROLYTE ADDITIVE FOR LITHIUM SECONDARY BATTERY, ELECTROLYTE FOR LITHIUM SECONDARY BATTERY INCLUDING THE SAME, AND LITHIUM SECONDARY BATTERY INCLUDING ELECTROLYTE

(71) Applicant: Samsung SDI Co., Ltd., Yongin-si (KR)

(72) Inventors: Jinhyeok Lim, Yongin-si (KR); Pavel Shatunov, Yongin-si (KR); Olga Tsay, Yongin-si (KR); Younghye Kang, Yongin-si (KR); Aeran Kim, Yongin-si (KR); Hyejin Park, Yongin-si (KR); Myungheui Woo, Yongin-si (KR); Duckjae You, Yongin-si (KR); Taejin Lee, Yongin-si (KR); Harim Lee, Yongin-si (KR); Wonseok Cho, Yongin-si (KR); Hyunbong Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 463 days.

(21) Appl. No.: 17/630,120

(22) PCT Filed: Jul. 28, 2020

(86) PCT No.: PCT/KR2020/009938
§ 371 (c)(1),
(2) Date: Jan. 25, 2022

(87) PCT Pub. No.: WO2021/020864
PCT Pub. Date: Feb. 4, 2021

(65) Prior Publication Data
US 2022/0263132 A1    Aug. 18, 2022

(30) Foreign Application Priority Data

Jul. 31, 2019    (KR) .................. 10-2019-0093356

(51) Int. Cl.
*H01M 10/0567*    (2010.01)
*H01M 4/02*    (2006.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| 8,404,389 B2 | 3/2013 | Ihara et al. |
| 10,316,006 B2 | 6/2019 | Moganty et al. |

(Continued)

FOREIGN PATENT DOCUMENTS

| JP | 2000-223152 A | 8/2000 |
| JP | 2001-52965 A | 2/2001 |

(Continued)

OTHER PUBLICATIONS

EPO Extended European Search Report dated Jan. 3, 2024, issued in corresponding European Patent Application No. 20848662.1 (5 pages).

(Continued)

*Primary Examiner* — Robert S Carrico
(74) *Attorney, Agent, or Firm* — Lewis Roca Rothgerber Christie LLP (57) ABSTRACT

Provided are an electrolyte additive for lithium secondary batteries, an electrolyte for lithium secondary batteries
(Continued)

including the same, and a lithium secondary battery including the electrolyte, the additive including a compound represented by Formula 1 below:

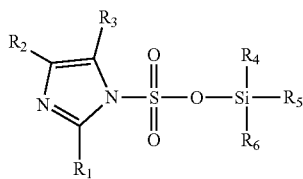

<Formula 1>

In Formula 1, $R_1$ to $R_6$ are as defined in the detailed description.

19 Claims, 2 Drawing Sheets

(51) Int. Cl.
  *H01M 4/505* (2010.01)
  *H01M 4/525* (2010.01)
  *H01M 10/0525* (2010.01)
  *H01M 10/0569* (2010.01)
(52) U.S. Cl.
  CPC .. *H01M 10/0525* (2013.01); *H01M 2004/028* (2013.01); *H01M 10/0569* (2013.01); *H01M 2300/0025* (2013.01)

(56) References Cited

U.S. PATENT DOCUMENTS

| | | | |
|---|---|---|---|
| 2002/0197537 | A1* | 12/2002 | Kim .......... H01M 10/0567 429/340 |
| 2020/0373617 | A1 | 11/2020 | Kim et al. |
| 2022/0077498 | A1* | 3/2022 | Oh .......... H01M 10/4235 |

FOREIGN PATENT DOCUMENTS

| | | |
|---|---|---|
| JP | 2002-280063 A | 9/2002 |
| JP | 2014-127354 A | 7/2014 |
| KR | 10-2008-0052421 A | 6/2008 |
| KR | 10-2008-0097599 A | 11/2008 |
| KR | 10-2018-0137527 A | 12/2018 |
| KR | 10-2019-0027189 A | 3/2019 |
| KR | 10-2019-0055733 A | 5/2019 |

OTHER PUBLICATIONS

Wotango, Aselefech Sorsa, et al., "Improved Interfacial Properties of MCMB Electrode by 1-(Trimethylsilyl)imidazole as New Electrolyte Additive to Suppress $LiPF_6$ Decomposition," ACS Applied Materials & Interfaces, 2017, pp. 2410-2420.

Dabkowski, W., et al., "A Convenient Synthesis Of Phosphorus And Sulfonyl Substituted N-Imidazoles (Triazoles) Using The Corresponding Acid Chlorides And N-Trimethylsilyl Imidazoles (Triazoles)," Phosphorus and Sulfur and the Related Elements, 1986, vol. 26, 7 pages.

Korean Notice Of Allowance dated Mar. 7, 2023, issued in corresponding Korean Patent Application No. 10-2019-0093356 (3 pages).

* cited by examiner

ELECTROLYTE ADDITIVE FOR LITHIUM SECONDARY BATTERY, ELECTROLYTE FOR LITHIUM SECONDARY BATTERY INCLUDING THE SAME, AND LITHIUM SECONDARY BATTERY INCLUDING ELECTROLYTE

CROSS-REFERENCE TO RELATED APPLICATION(S)

This application is a U.S. National Phase Patent Application of International Application Number PCT/KR2020/009938, filed on Jul. 28, 2020, which claims priority of Korean Patent Application Number 10-2019-0093356, filed on Jul. 31, 2019, the entire content of each of which is incorporated herein by reference.

TECHNICAL FIELD

The present disclosure relates to an electrolyte additive for a lithium secondary battery, an electrolyte for a lithium secondary battery including the same, and a lithium secondary battery including the electrolyte.

BACKGROUND ART

Lithium secondary batteries are used as power sources for driving portable electronic appliances such as video cameras, mobile phones, and notebook computers. Rechargeable lithium secondary batteries have higher energy density per unit weight than known lead batteries, nickel-cadmium batteries, nickel metal hydride batteries, and nickel-zinc batteries, and may be charged at high speed.

Since lithium secondary batteries operate at a high driving voltage, an aqueous electrolyte having high reactivity with lithium cannot be used. As an electrolyte for lithium secondary batteries, an organic electrolyte is generally used. An organic electrolyte is prepared by dissolving a lithium salt in an organic solvent. It is preferable that the organic solvent is stable at high voltage, has high ionic conductivity and a high dielectric constant, and has low viscosity.

However, when an organic electrolyte containing a lithium salt is used as the electrolyte for a lithium secondary battery, lifespan characteristics and high-temperature stability of the lithium secondary battery may be deteriorated due to side reactions between the anode/cathode and the electrolyte. Therefore, there is a need for an electrolyte capable of providing a lithium secondary battery having improved lifespan characteristics and high-temperature stability.

DESCRIPTION OF EMBODIMENTS

Technical Problem

An aspect is to provide an electrolyte additive for a lithium secondary battery.

Another aspect is to provide an electrolyte for a lithium secondary battery including the electrolyte additive.

Still another aspect is to provide a lithium secondary battery including the electrolyte for a lithium secondary battery.

Solution to Problem

According to an aspect, there is provided an electrolyte additive for a lithium secondary battery, the electrolyte additive including a compound represented by Formula 1 below:

<Formula 1> in Formula 1, $R_1$ to $R_3$ are each independently hydrogen, a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group, and $R_4$ to $R_6$ are each independently a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group.

According to another aspect, there is provided an electrolyte including:
 a lithium salt;
 an organic solvent; and
 the above-described additive.

According to still another aspect, there is provided a lithium secondary battery including:
 a cathode including a cathode active material;
 an anode including an anode active material; and
 an electrolyte provided between the cathode and the anode,
wherein the electrolyte includes the above-described additive.

Advantageous Effects of Disclosure

When an electrolyte for a lithium secondary battery including an electrolyte additive according to an embodiment is used, a lithium secondary battery having improved high-temperature characteristics and resistance characteristics can be manufactured.

MODE OF DISCLOSURE

Hereinafter, an electrolyte additive for a lithium secondary battery according to an embodiment, an electrolyte for a lithium secondary battery including the same, and a lithium secondary battery including the electrolyte will be described in more detail.

An electrolyte additive for a lithium secondary battery according to an embodiment includes: a compound represented by Formula 1 below:

<Formula 1> in Formula 1, $R_1$ to $R_3$ are each independently hydrogen, a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group, and $R_4$ to $R_6$ are each independently a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group.

In Formula 1, the substituent of the substituted $C_1$-$C_{30}$ alkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group is, for example, at least one selected from the group consisting of a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

A lithium secondary battery having a high power and a high capacity can be manufactured by using a lithium transition metal oxide containing nickel and one or more other transition metals and having a nickel content of 80 mol % or more with respect to the total number of moles of the transition metals as a cathode active material. However, generally, in a lithium secondary battery, the lithium transition metal oxide having a high nickel content has an unstable surface structure, so gas generation due to side reactions in the charging and discharging process of the battery increases, and elution of a transition metal such as nickel is further deepened. Accordingly, the lifespan characteristics of the lithium secondary battery are deteriorated. In addition, since the resistance of the lithium secondary battery is increased at high temperature, it is necessary to improve stability at high temperature.

When the electrolyte additive containing the compound of Formula 1 is used, it is possible to manufacture a lithium secondary battery having improved lifespan characteristics and high-temperature stability due to excellent resistance suppression effect at high temperature.

In Formula 1, $R_1$ to $R_3$ are each independently hydrogen; a substituted or unsubstituted $C_1$-$C_{30}$ alkyl group; a $C_1$-$C_{30}$ alkyl group substituted with one or more selected from the group consisting of a methyl group, an ethyl group, a propyl group, a butyl group, —F, —Cl, —Br, —I, a cyano group, a hydroxyl group, and a nitro group; or a $C_2$-$C_{30}$ alkenyl group substituted with one or more selected from the group consisting of a methyl group, an ethyl group, a propyl group, a butyl group, a hydroxyl group, and a nitro group.

In Formula 1, $R_4$ to $R_6$ are each independently a $C_1$-$C_3$ alkyl group; a $C_1$-$C_{30}$ alkyl group substituted with one or more selected from the group consisting of a methyl group, an ethyl group, a propyl group, a butyl group, —F, —Cl, —Br, —I, a cyano group, a hydroxyl group and a nitro group; or a $C_2$-$C_{30}$ alkenyl group substituted with one or more selected from the group consisting of a methyl group, an ethyl group, a propyl group, a butyl group, —F, —Cl, —Br, —I, a cyano group, a hydroxyl group, and a nitro group.

In Formula 1, $R_1$ to $R_3$ are each independently, for example, hydrogen or a $C_1$-$C_{10}$ alkyl group, specifically, a $C_1$-$C_5$ alkyl group.

According to an embodiment, the compound of Formula 1 may be a compound of Formula 2 below.

<Formula 2>

In Formula 2, $R_4$ to $R_6$ are each independently a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group.

In Formula 2, the substituent of the substituted $C_1$-$C_{30}$ alkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group is at least one selected from the group consisting of a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

In Formula 2, $R_4$ to $R_6$ are each independently an unsubstituted $C_1$-$C_{10}$ alkyl group; a $C_1$-$C_{10}$ alkyl group substituted with at least one selected from the group consisting of a methyl group, an ethyl group, a propyl group, a butyl group, —F, —Cl, —Br, —I, a cyano group, a hydroxyl group, and a nitro group; an unsubstituted $C_2$-$C_{10}$ alkenyl group; a $C_2$-$C_{10}$ alkenyl group substituted with at least one selected from the group consisting of a methyl group, an ethyl group, a propyl group, a butyl group, —F, —Cl, —Br, —I, a cyano group, a hydroxyl group, and a nitro group; an unsubstituted $C_4$-$C_{10}$ carbocyclic group; a $C_4$-$C_{10}$ carbocyclic group substituted with at least one selected from the group consisting of a methyl group, an ethyl group, a propyl group, a butyl group, —F, —Cl, —Br, —I, a cyano group, a hydroxy group, and a nitro group; an unsubstituted $C_6$-$C_{10}$ aryl group; or a $C_6$-$C_{10}$ aryl group substituted with at least one selected from the group consisting of a methyl group, an ethyl group, a propyl group, a butyl group, —F, —Cl, —Br, —I, a cyano group, a hydroxyl group, and a nitro group.

The reason why the compound of Formula 1 is added to an electrolyte to improve the performance of a lithium secondary battery will be described in more detail below, but this is to help the understanding of the present disclosure and the scope of the present disclosure is not limited to the scope of the following description.

Although $LiPF_6$ is generally used as a lithium salt contained in the electrolyte, it has problems in that it lacks thermal stability and is easily hydrolyzed even by moisture. However, when an additive including the compound represented by Formula 1 is added to the electrolyte, nitrogen of the imidazole ring in the compound of Formula 1 captures $PF_5$-ions generated by decomposition of water ($H_2O$) molecules and $LiPF_6$, it is possible to suppress the hydrolysis reaction of $LiPF_6$ caused by moisture. As a result, gas generation inside the lithium secondary battery is suppressed, and thus cycle life characteristics of the battery are improved. In addition, swelling of the battery due to suppression of gas generation can be prevented.

In addition, since the compound represented by Formula 1 contains nitrogen, decomposition of an organic solvent such as ethylene carbonate (EC) is suppressed to reduce gas generation, and as a result, a resistance increase rate can be lowered. In addition, since the compound represented by Formula 1 has an $SO_2$ moiety, it is possible to form a stable thin film on a cathode. Due to the formation of such a thin film, the additional elution of metals from a substrate is suppressed, and as a result, overdischarge of the lithium secondary battery is suppressed while the lithium secondary battery is left, so that the characteristics of the lithium secondary battery can be improved.

During the initial charging of the lithium secondary battery, the decomposition reaction of an electrolyte occurs on the surface of an anode, because the reduction potential of the electrolyte is relatively higher than the potential of lithium. This electrolyte decomposition reaction forms a solid electrolyte interphase (SEI) on the surface of the electrode to suppress the movement of electrons required for a reaction between the anode and the electrolyte, thereby preventing the additional decomposition of the electrolyte. Accordingly, the performance of the battery largely depends on the characteristics of the film formed on the surface of the anode. Considering this fact, through the introduction of an electrolyte additive capable of being decomposed before the electrolyte during a charging reaction, it is required to form an SEI layer that is more robust and has excellent electrical properties.

The additive for electrolytes of a lithium secondary battery, represented by Formula 1, includes a silyl group —Si($R_4$)($R_5$)($R_6$) at the end thereof, and thus an SEI film with a high concentration of silyl groups may be formed, thereby forming a high-polarity film having chemical stability. Accordingly, resistance at the interface between the electrolyte and the anode is lowered to improve lithium-ion conductivity, thereby having an effect of increasing a low-temperature discharge voltage.

The compound represented by Formula 1 may be selected from compounds represented by Formulas 3 to 6 below.

<Formula 3>

<Formula 4> in Formula 4, Ph is a phenyl group,

<Formula 5>

<Formula 6>

The above-described compounds serve as a salt-by product ($PF_5$) stabilizer and a HF scavenger by an imidazole functional group, and are oxidized and decomposed at the cathode to form a sulfite-based film, thereby serving to inhibit the side reactions (solvent decomposition) of the cathode at high temperature.

An electrolyte for a lithium secondary battery according to an embodiment includes a lithium salt; an organic solvent; and the additive. The content of the additive may be in the range of 0.1 wt % to 10 wt % based on the total weight of the electrolyte for a lithium secondary battery, but is not limited thereto, and may be appropriately selected within a range that does not impair battery characteristics. For example, the content of the additive may be in the range of 0.5 wt % to 5 wt % based on the total weight of the electrolyte for lithium secondary batteries. When the content of the additive is within the above range, it is possible to manufacture a lithium secondary battery having improved high-temperature characteristics and resistance characteristics without deterioration in battery lifespan.

The electrolyte for lithium secondary battery according to an embodiment may be an electrolyte including 0.1 wt % to 2 wt % of at least one selected from compounds represented by Formulas 3 to 6 below, wherein the organic solvent includes a mixed solvent of 50 vol % to 95 vol % of chain carbonate and 5 vol % to 50 vol % of cyclic carbonate.

<Formula 3>

<Formula 4>

<Formula 5>

<Formula 6>

According to an embodiment, the lithium salt may include at least one selected from $LPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, and compounds represented by Formulas 10 to 13 below, but is not limited thereto, and any lithium salt may be used as long as it is used in the art.

[Formula 10]

[Formula 11]

[Formula 12]

[Formula 13]

The concentration of the lithium salt in the electrolyte is 0.01 M to 5.0 M, for example, 0.05 M to 5.0 M, for example, 0.1 M to 5.0 M, for example, 0.1 M to 2.0 M. When the concentration of the lithium salt is within the above range, further improved characteristics of the lithium secondary battery may be obtained.

The organic solvent may be at least one selected from a carbonate-based solvent, an ester-based solvent, an ether-based solvent, and a ketone-based solvent.

As the carbonate-based solvent, ethyl methyl carbonate (EMC), methyl propyl carbonate (MPC), ethyl propyl carbonate (EPC), dimethyl carbonate (DMC), diethyl carbonate (DEC), dipropyl carbonate (DPC), propylene carbonate (PC), ethylene carbonate (EC), butylene carbonate (BC), or the like may be used, as the ester-based solvent, methyl propionate, ethyl propionate, ethyl butyrate, methyl acetate, ethyl acetate, n-propyl acetate, dimethyl acetate, gamma butyrolactone, decanolide, gamma valerolactone, mevalonolactone (mevalonolactone)), caprolactone, or the like may be used, as the ether-based solvent, dibutyl ether, tetraglyme, diglyme, dimethoxyethane, 2-methyltetrahydrofuran, tetrahydrofuran, or the like may be used, as the ketone-based solvent, cyclohexanone or the like may be used, and as the nitrile-based solvent, acetonitrile (AN), succinonitrile (SN), adiponitrile, or the like may be used. As other solvents, dimethyl sulfoxide, dimethylformamide, dimethylacetamide, tetrahydrofuran, and the like may be used, but are not necessarily limited thereto, and any solvent that can be used as an organic solvent in the art may be used. For example, the organic solvent may be a mixed solvent of 50 vol % to 95 vol % of chained carbonate and 5 vol % to 50 vol % of cyclic carbonate, for example, a mixed solvent of 70 vol % to 95 vol % of chain carbonate and 5 vol % to 30 vol % of cyclic carbonate. For example, the organic solvent may be a mixed solvent of three or more organic solvents.

According to an embodiment, the organic solvent may include at least one selected from the group consisting of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinyl ethylene carbonate (VEC), butylene carbonate, ethyl propionate, ethyl butyrate, dimethyl sulfoxide, dimethyl formamide, dimethyl acetamide, gamma-valerolactone, gamma-butyrolactone, and tetrahydrofuran, but is not limited thereto, and any organic solvent that can be used in the art may be used.

According to an embodiment, the electrolyte for lithium secondary battery may further include an aliphatic nitrile compound. For example, the aliphatic nitrile compound may include, but is not limited to, acetonitrile (AN) or succinonitrile (SN), and any nitrile group may be used as long as a nitrile group is included at the end of hydrocarbon. For example, the content of the aliphatic nitrile compound may be in the range of 0.1% to 10% by weight based on the total weight of the electrolyte for a lithium secondary battery, but is not limited thereto, and may be appropriately selected within a range that does not inhibit a metal elution suppressing effect.

The electrolyte may be in a liquid or gel state.

A lithium secondary battery according to another embodiment includes a cathode including a cathode active material; an anode including an anode active material; and an electrolyte provided between the cathode and the anode, wherein the electrolyte includes the above-described additive.

Since the lithium secondary battery includes the above-described additive, an increase in initial resistance of the lithium secondary battery is suppressed, gas generation due to side reactions is suppressed, and lifespan characteristics of the lithium secondary battery are improved. The cathode active material includes a lithium transition metal oxide including nickel and other transition metals. In the lithium transition metal oxide including nickel and other transition metals, the content of nickel may be 60 mol % or more, for example, 75 mol % or more, for example, 80 mol % or more, for example, 85 mol % or more, for example, 90 mol % or more with respect to the total number of moles of the transition metals.

For example, the lithium transition metal oxide may be represented by Formula 7 below:

$$Li_aNi_xCo_yM_zO_{2-b}A_b \qquad <\text{Formula 7}>$$

in Formula 7, $1.0 \leq a \leq 1.2$, $0 \leq b \leq 0.2$, $0.6 \leq x < 1$, $0 < y \leq 0.3$, $0 < z \leq 0.3$, $x+y+z=1$, M is at least one selected from the group consisting of manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B), and A is F, S, Cl, Br, or a combination thereof. For example, $0.7 \leq x < 1$, $0 < y \leq 0.3$, $0 < z \leq 0.3$; $0.8 \leq x < 1$, $0 < y \leq 0.3$, $0 < z \leq 0.3$; $0.8 \leq x < 1$, $0 < y \leq 0.2$, $0 < z \leq 0.2$; $0.83 \leq x < 0.97$, $0 < y \leq 0.15$, $0 < z \leq 0.15$; or $0.85 \leq x < 0.95$, $0 < y \leq 0.1$, $0 < z \leq 0.1$.

For example, the lithium transition metal oxide may be a compound represented by Formula 8 or 9:

$$LiNi_xCo_yMn_zO_2 \qquad <\text{Formula 8}>$$

in Formula 8, $0.6 \leq x \leq 0.95$, $0 < y \leq 0.2$, $0 < z \leq 0.1$, for example, $0.7 \leq x \leq 0.95$, $0 < y \leq 0.3$, $0 < z \leq 0.3$ $$LiNi_xCo_yAl_zO_2 \qquad <\text{Formula 9}>$$

in Formula 9, $0.6 \leq x \leq 0.95$, $0 < y \leq 0.2$, $0 < z \leq 0.1$, for example, $0.7 \leq x \leq 0.95$, $0 < y \leq 0.3$, $0 < z \leq 0.3$, for example, $0.8 \leq x \leq 0.95$, $0 < y \leq 0.3$, $0 < z \leq 0.3$, for example, $0.82 \leq x \leq 0.95$, $0 < y \leq 0.15$, $0 < z \leq 0.15$, and for example, $0.85 \leq x \leq 0.95$, $0 < y \leq 0.1$, $0 < z \leq 0.1$.

For example, lithium transition metal oxide may be $LiNi_{0.7}Co_{0.2}Mn_{0.1}O_2$, $LiNi_{0.88}Co_{0.08}Mn_{0.04}O_2$, $LiNi_{0.8}Co_{1.15}Mn_{0.05}O_2$, $LiNi_{0.8}Co_{0.1}Mn_{0.3}O_2$, $LiNi_{0.88}Co_{0.1}Mn_{0.02}O_2$, $LiNi_{0.8}Co_{1.15}Al_{0.15}O_2$, $LiNi_{0.8}Co_{0.1}Mn_{0.2}O_2$, or $LiNi_{0.88}Co_{0.1}Al_{0.02}O_2$.

According to another embodiment, the cathode active material includes at least one active material selected from the group consisting of Li—Ni—Co—Al (NCA), Li—Ni—Co—Mn (NCM), lithium cobalt oxide ($LiCOO_2$), lithium manganese oxide ($LiMnO_2$), lithium nickel oxide and ($LiNiO_2$), and lithium iron phosphate ($LiFePO_4$).

The anode active material may include at least one selected from a silicon-based compound, a carbon-based material, a composite of a silicon-based compound and a carbon-based compound, and a silicon oxide (SiOx, 0<x<2). The silicon-based compound may be silicon particles, silicon alloy particles, or the like.

The size of the silicon-based compound is less than 200 nm, for example, 10 nm to 150 nm. The term "size" may indicate an average particle diameter when the silicon-based compound is spherical, and may indicate an average long axis length when the silicon particles are non-spherical.

When the size of the silicon-based compound is within the above range, lifespan characteristics are excellent, and when the electrolyte according to an embodiment is used, the lifespan of the lithium secondary battery is further improved.

The carbon-based material may be crystalline carbon, amorphous carbon, or a mixture thereof. The crystalline carbon may be amorphous, plate-like, flake-like, spherical or fibrous graphite, such as natural graphite or artificial graphite, and the amorphous carbon may be soft carbon (low temperature calcined carbon) or hard carbon, mesophase pitch carbide, calcined coke, or the like.

The composite of the silicon-based compound and the carbon-based compound may be a composite having a structure in which silicon nanoparticles are arranged on the carbon-based compound, a composite in which silicon particles are included on the surface and inside of the carbon-based compound, or a composite in which silicon particles are coated with the carbon-based compound and arranged in the carbon-based compound. In the composite of the silicon-based compound and the carbon-based compound, the carbon-based compound may be graphite, graphene, graphene oxide, or a combination thereof.

The composite of the silicon-based compound and the carbon-based compound may be an active material obtained by dispersing silicon nanoparticles having an average particle diameter of about 200 nm or less on the carbon-based compound particles and then performing carbon coating, an active material in which silicon (Si) particles are present on and inside graphite, or the like. The average particle diameter of secondary particles of the composite of the silicon-based compound and the carbon-based compound may be 5 μm to 20 μm. The average particle diameter of the silicon nanoparticles may be 5 nm or more, for example 10 nm or more, for example 20 nm or more, for example 50 nm or more, for example 70 nm or more. The average particle diameter of the silicon nanoparticles may be 200 nm or less, 150 nm or less, 100 nm or less, 50 nm or less, 20 nm or less, or 10 nm or less. For example, the average particle diameter of the silicon nanoparticles may be 100 nm to 150 nm.

The average particle diameter of secondary particles of the composite of the silicon-based compound and the carbon-based compound may be 5 μm to 18 μm, for example, 7 μm to 15 μm, for example, 10 μm to 13 μm.

The composite of the silicon-based compound and the carbon-based compound according to an embodiment is a porous silicon composite cluster including a porous core containing porous silicon composite secondary particles and a shell disposed on the porous core and containing second graphene, the porous silicon composite secondary particles include an aggregate of two or more silicon composite primary particles, and the silicon composite primary particles may be a porous silicon composite cluster including silicon, silicon oxide (SiOx) (0<x<2) disposed on the silicon, and first graphene disposed on the silicon oxide.

The composite of the silicon-based compound and the carbon-based compound according to another embodiment may be a porous silicon composite cluster structure. The porous silicon composite cluster structure includes a porous silicon composite cluster including porous silicon composite secondary particles and a second carbon flake on at least one surface of the porous silicon composite secondary particles, and a carbon-based coating film containing amorphous carbon and disposed on the porous silicon composite cluster, the porous silicon composite secondary particles include an aggregate of two or more silicon composite primary particles, the silicon composite primary particles include silicon; a silicon oxide (SiOx) (0<x<2) on at least one surface of the silicon, and a first carbon flake on at least one surface of the silicon oxide, and the silicon oxide may exist in the state of a film, a matrix, or a combination thereof.

Each of the first carbon flake and the second carbon flake may exist in the form of a film, particle, a matrix, or a combination thereof. In addition, each of the first carbon flake and the second carbon flake may be graphene, graphite, carbon fiber, graphene oxide, or the like.

The composite of the silicon-based compound and the carbon-based compound may be an active material obtained by dispersing silicon nanoparticles having an average particle diameter of about 200 nm or less on the carbon-based compound particles and then performing carbon coating, an active material in which silicon (Si) particles are present on and inside graphite, or the like. The average particle diameter of the secondary particles of the composite of the silicon-based compound and the carbon-based compound may be 5 μm to 20 μm. The average particle diameter of the silicon nanoparticles may be 5 nm or more, for example 10 nm or more, for example 20 nm or more, for example 50 nm or more, for example 70 nm or more. The average particle diameter of the silicon nanoparticles may be 200 nm or less, 150 nm or less, 100 nm or less, 50 nm or less, 20 nm or less, or 10 nm or less. For example, the average particle diameter of the silicon nanoparticles may be 100 nm to 150 nm.

The average particle diameter of the secondary particle of the composite of the silicone compound and the carbon-based compound may be 5 μm to 18 μm, for example, 7 μm to 15 μm, for example, 10 μm to 13 μm.

The composite of the silicon-based compound and the carbon-based compound according to an embodiment is a porous silicon composite cluster including a porous core containing porous silicon composite secondary particles and a shell disposed on the porous core and containing second graphene, the porous silicon composite secondary particles include an aggregate of two or more silicon composite primary particles, and the silicon composite primary particles may be a porous silicon composite cluster including silicon, silicon oxide (SiOx) (0<x<2) disposed on the silicon, and first graphene disposed on the silicon oxide. The composite of the silicon-based compound and the carbon-based compound according to another embodiment may be a porous silicon composite cluster structure. The porous silicon composite cluster structure includes a porous silicon composite cluster including porous silicon composite secondary particles and a second carbon flake on at least one surface of the porous silicon composite secondary particles, and a carbon-based coating film containing amorphous carbon and disposed on the porous silicon composite cluster, the porous silicon composite secondary particles include an aggregate of two or more silicon composite primary particles, the silicon composite primary particles include silicon; a silicon oxide (SiOx) (O<x<2) on at least one surface of the silicon, and a first carbon flake on at least one surface of the silicon oxide, and the silicon oxide may exist in the state of a film, a matrix, or a combination thereof.

Each of the first carbon flake and the second carbon flake may exist in the form of a film, particle, a matrix, or a combination thereof. In addition, each of the first carbon flake and the second carbon flake may be graphene, graphite, carbon fiber, graphene oxide, or the like.

The composite of the silicon-based compound and the carbon-based compound may be, for example, an active material in which Si particles are dispersed on graphite particles and then coated with a carbon-based compound, an active material in which Si particles are present on and inside graphite; or a composite in which silicon particles are coated with a carbon-based compound.

The average particle diameter of the Si particles is 50 nm to 200 nm, for example, 100 nm to 180 nm, for example, about 150 nm. The composite of the silicon-based compound and the carbon-based compound may include, for example, the porous silicon composite cluster disclosed in Korean Patent Publication No. 10-2018-0031585 and the porous silicon composite cluster structure disclosed in Korean Patent Publication No. 10-2018-0056395.

After the formation of the lithium secondary battery is performed and then the lithium secondary battery is stored at high temperature (60° C.) for 30 days, a direct current internal resistance increase rate of the lithium secondary battery may be 155% or less, for example 150% or less, for example 135% to 155%. The formation of the lithium secondary battery may be performed during 3 cycles.

The lithium secondary battery is not particularly limited in form, and includes a lithium-ion battery, a lithium-ion polymer battery, a lithium sulfur battery, and the like.

The lithium secondary battery may be manufactured by the following method.

First, a cathode is prepared.

For example, a cathode active material composition in which a cathode active material, a conductive material, a binder, and a solvent are mixed is prepared. A cathode plate is prepared by coating a metal current collector with the cathode active material composition. Alternatively, the cathode plate may be prepared by casting the cathode active material composition onto a separate support, separating a film from the support and then laminating the separated film on a metal current collector. The cathode is not limited to the above-described form, but may have a form other than the above-described form.

The cathode active material, which is a lithium-containing metal oxide, may be used without limitation as long as it is generally used in the art. For example, as the lithium-containing metal oxide, at least one of composite oxides of lithium and a metal selected from cobalt, manganese, nickel, and combinations thereof may be used. Specifically, a compound represented by any one of Formulae of $Li_aA_{1-b}B^1{}_bD^1{}_2$ (where, $0.90 \leq a \leq 1.8$, and $0 \leq b \leq 0.5$ are satisfied); $Li_aE_{1-b}B^1{}_bO_{2-c}D^1{}_c$ (where, $0.90 \leq a \leq 1.8$, $0 \leq b \leq 0.5$, and $0 \leq c \leq 0.05$ are satisfied); $Li_aE_{2-b}B^1{}_bO_{4-c}D^1{}_c$ (where, $0 \leq b \leq 0.5$ and $0 \leq c \leq 0.05$ are satisfied); $Li_aN_{1-b-c}Co_bB^1{}_cD^1{}_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB^1{}_cO_{2-\alpha}F^1{}_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Co_bB^1{}_cO_{2-\alpha}F^1{}_2$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cD^1{}_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB^1{}_cO_{2-\alpha}F^1{}_\alpha$ (where, $0.90 \leq a \leq 1.8$, $0 \leq b \leq 0.5$, $0 \leq c \leq 0.05$, and $0 < \alpha < 2$ are satisfied); $Li_aNi_{1-b-c}Mn_bB^1{}_cO_{2-\alpha}F^1{}_2$ (where, $0.90 \leq a \leq 1.8$, $0 \leq b \leq 0.5$, $0 \leq c \leq 0.05$, and $0 < \alpha < 2$ are satisfied); $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$ are satisfied); $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$ are satisfied); $Li_aNiG_bO_2$ (where, $0.90 \leq a \leq 1.8$ and $0.001 \leq b \leq 0.1$ are satisfied); $Li_aCoG_bO_2$ (where, $0.90 \leq a \leq 1.8$ and $0.001 \leq b \leq 0.1$ are satisfied); $Li_aMnG_bO_2$ (where, $0.90 \leq a \leq 1.8$ and $0.001 \leq b \leq 0.1$ are satisfied); $Li_aMn_2G_bO_4$ (where, $0.90 \leq a \leq 1.8$ and $0.001 \leq b \leq 0.1$ are satisfied); $QO_2$; $QS_2$; $LiQS_2$; $V_2O_5$; $LiV_2O_5$; $LiI^1O_2$; $LiNiVO_4$; $Li_{(3-f)}J_2(PO_4)_3(0 \leq f \leq 2)$; $Li_{(3-f)}Fe_2(PO_4)_3(0 \leq f \leq 2)$; and $LiFePO_4$ may be used.

In Formulas above, A is Ni, Co, Mn, or a combination thereof; $B^1$ is Al, Ni, Co, Mn, Cr, Fe, Mg, Sr, V, a rare earth element, or a combination thereof; $D^1$ is O, F, S, P, or a combination thereof; E is Co, Mn, or a combination thereof; $F^1$ is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the lithium-containing metal oxide may be $LiCoO_2$, $LiMn_gO_{2g}$ (g=1 or 2), $LiNi_{1-g}Mn_gO_{2g}$ (0<g<1), $LiNi_{1-g-k}Co_gMn_kO_2$ ($0 \leq g \leq 0.5$, $0 \leq k \leq 0.5$), or $LiFePO_4$.

Specifically, the cathode may include a cathode active material having a layered structure.

For example, the cathode active material includes a lithium transition metal oxide containing nickel and one or more other transition metals, and the content of nickel is 60 mol % or more, for example 75 mol % or more, for example, 80 mol % or more, for example, 85 mol % or more, for example, 90 mol % or more, based on the total number of moles of the transition metals.

For example, the cathode active material may be $LiNi_{0.33}Co_{0.33}Mn_{0.33}O_2$, $LiNi_{0.33}Co_{0.33}Al_{0.33}O_2$, $LiNi_{0.6}Co_{0.2}Mn_{0.2}O_2$, $LiNi_{0.6}Co_{0.2}Al_{0.2}O_2$, $LiNi_{0.8}Co_{0.1}Mn_{0.1}O_2$, or $LiNi_{0.8}Co_{0.15}Al_{0.1}O_2$, but is not limited thereto.

Also, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any coating method may be used as long as this compound may be coated with such elements by a method that does not adversely affect the physical properties of the cathode active material (for example, spray coating, dipping or the like). This coating method will be understood by those skilled in the art, so that a detailed description thereof will be omitted.

As the conductive material, for example, carbon black, graphite fine particles, or the like may be used, but is not limited thereto. Any conductive material may be used as long as it may be used in the art.

As the binder, a vinylidene fluoride/hexafluoropropylene copolymer, polyvinylidene fluoride (PVDF), polyacrylonitrile, polymethylmethacrylate, polytetrafluoroethylene and mixtures thereof, or a styrene butadiene rubber-based polymer may be used. Any binder may be used as long as it is used in the art.

As the solvent, N-methylpyrrolidone, acetone, water, or the like may be used, but the present disclosure is not limited thereto. Any solvent may be used as long as it is used in the art.

The content of the cathode active material, the content of the conductive material, the content of the binder, and the content of the solvent are levels commonly used in the lithium secondary battery. At least one of the conductive material, the binder, and the solvent may be omitted depending on the use and configuration of the lithium battery.

Next, an anode is prepared.

For example, an anode active material composition in which an anode active material, a conductive material, a binder, and a solvent are mixed is prepared. An anode plate is prepared by coating a metal current collector with the anode active material composition. Alternatively, the anode plate may be prepared by casting the anode active material composition onto a separate support, separating a film from the support and then laminating the separated film on a metal current collector.

The anode active material may be, for example, at least one selected from a silicon-based compound, a carbon-based material, a silicon oxide (SiOx (0<x<2), and a composite of a silicon-based compound and a carbon-based compound.

As the anode active material, any anode active material may be used as long as it is used as an anode active material for lithium secondary batteries in the art. For example, the anode active material may include at least one selected from the group consisting of lithium metal, a metal alloyable with lithium, a transition metal oxide, a non-transition metal oxide, and a carbon-based material.

As the anode active material, any anode active material may be used together as long as it is used as an anode active material for lithium secondary batteries in the art, in addition to the above-described anode active material. For example, the metal alloyable with lithium may be Si, Sn, Al, Ge, Pb, Bi, Sb, Si—Y alloy (wherein Y is an alkali metal, an alkaline earth metal, a group 13 element, a group 14 element, a transition metal, a rare earth element, or a combination thereof, and not Si), Sn—Y alloy (wherein Y is an alkali metal, an alkaline earth metal, a group 13 element, a group 14 element, a transition metal, a rare earth element, or a combination, and not Sn), or the like. The element Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

For example, the anode active material may be lithium titanium oxide, vanadium oxide, lithium vanadium oxide, or the like.

In the anode active material composition, the conductive material and the binder may be the same as those in the cathode active material composition.

However, in the anode active material composition, water may be used as a solvent. For example, water may be used as a solvent, carboxymethyl cellulose (CMC), styrene-butadiene rubber (SBR), an acrylate-based polymer, or a methacrylate-based polymer may be used as a binder, and carbon black, acetylene black, or graphite may be used as a conductive material.

The content of the anode active material, the content of the conductive material, the content of the binder, and the content of the solvent are levels commonly used in the lithium secondary battery. At least one of the conductive material, the binder, and the solvent may be omitted depending on the use and configuration of the lithium battery.

For example, the anode may be prepared by mixing 94 w % of the anode active material, 3 wt % of the binder, and 3 wt % of the conductive material in a powder state, adding water to a solid content of about 70 wt % to make a slurry, and then coating, drying and rolling the slurry.

A composite of silicon and a carbon-based compound may be used as the anode active material.

In the anode active material composition, the conductive material, the binder, and the solvent may be the same as those in the cathode active material composition.

The content of the anode active material, the content of the conductive material, the content of the binder, and the content of the solvent are levels commonly used in the lithium secondary battery. At least one of the conductive material, the binder, and the solvent may be omitted depending on the use and configuration of the lithium battery. Next, a separator to be inserted between the anode and the cathode is prepared. As the separator, any separator may be used as long as it is commonly used in a lithium battery. As the separator, a separator having low resistance to the movement of ions in the electrolyte and superior in electrolyte wettability may be used. For example, the separator may include any one selected from glass fiber, polyester, Teflon, polyethylene, polypropylene, polytetrafluoroethylene (PTFE), and combinations thereof, and may be made in the form of nonwoven fabric or woven fabric. For example, a windable separator including polyethylene, polypropylene, or the like may be used in a lithium-ion battery, and a separator having good electrolyte impregnation ability may be used in a lithium-ion polymer battery. For example, the separator may be manufactured by the following method.

A polymer resin, a filler, and a solvent are mixed to prepare a separator composition. The separator composition is directly applied on an electrode and dried to form a separator. Alternatively, the separator composition is cast on a support and dried, a separation film is separated from the support, and then the separation film is laminated on the electrode to form a separator.

The polymer resin used in the manufacture of the separator is not limited, and any material may be used as long as it may be used in a binder of an electrode plate. For example, as the polymer resin, a vinylidene fluoride/hexafluoropropylene copolymer, polyvinylidene fluoride (PVDF), polyacrylonitrile, polymethyl methacrylate, or a mixture thereof may be used.

The loading level of the anode active material composition is set according to the loading level of the cathode active material composition. The loading level of the anode active material composition is 12 mg/cm$^2$ or more, for example 15 mg/cm$^2$ or more according to the capacity per g of the anode active material composition. Electrode density may be at least 1.5 g/cc, for example at least 1.6 g/cc. As a design that emphasizes energy density, a design with a density of 1.65 g/cc or more and 1.9 g/cc or less is preferred.

Next, the above-described electrolyte is prepared.

According to an embodiment, the electrolyte may further include a non-aqueous electrolyte, an organic solid electrolyte, and an inorganic solid electrolyte in addition to the above-described electrolyte.

As the organic solid electrolyte, for example, polyethylene derivatives, polyethylene oxide derivatives, polypropylene oxide derivatives, phosphoric acid ester polymers, polyester sulfide, polyvinyl alcohols, polyvinylidene fluoride, or the like may be used.

As the inorganic solid electrolyte, for example, $Li_3N$, $LiI$, $Li_5NI_2$, $Li_3N$-$LiI$-$LiOH$, $Li_2SiS_3$, $Li_4SiO_4$, $Li_4SiO_4$-$LiI$-$LiOH$, $Li_3PO_4$-$Li_2S$—$SiS_2$, or the like may be used.

Figure 1:
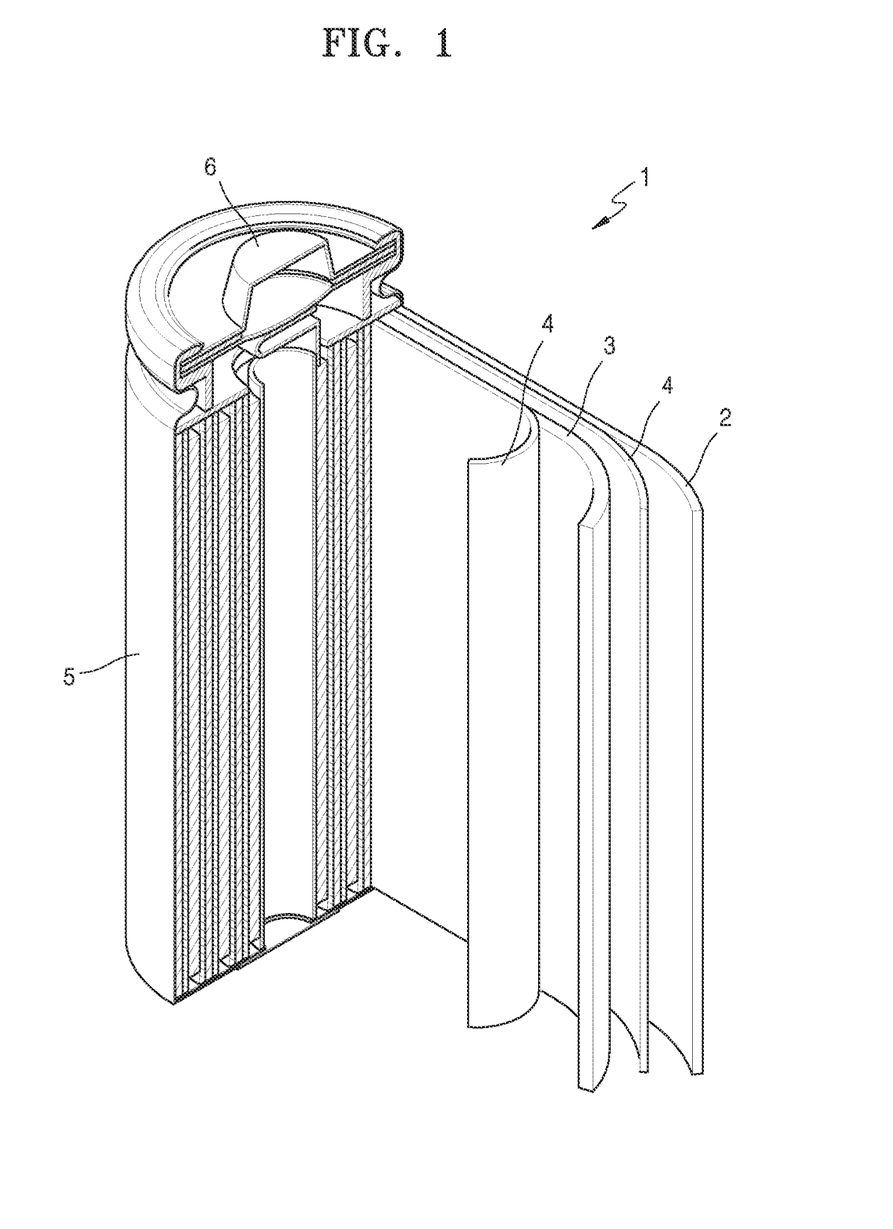
FIG. 1 is a schematic view of a lithium secondary battery according to an embodiment.

As shown in FIG. 1, the lithium secondary battery 1 includes a cathode 3, an anode 2, and a separator 4. The cathode 3, the anode 2, and the separator 4 are wound or folded and accommodated in a battery case 5. Then, the electrolyte according to an embodiment of the present disclosure is injected into the battery case 5, and the battery case 5 is sealed with a cap assembly 6 to complete the manufacture of the lithium secondary battery 1. The battery case 5 may have a cylindrical shape, a rectangular shape, or a thin film shape. For example, the lithium secondary battery 1 may be a large thin-film battery. The lithium secondary battery 1 may be a lithium-ion battery.

The separator 4 may be located between the cathode 3 and the anode 2 to form a battery structure. The battery structure is laminated as a bi-cell structure and then impregnated with an electrolyte, and the resulting product is accommodated in a pouch and sealed to complete a lithium-ion polymer battery.

Further, the plurality of battery structures are laminated to form a battery pack, and this battery pack may be used in all appliances requiring high capacity and high power. For example, the battery pack may be used in notebooks, smart phones, electric vehicles, and the like.

In the lithium secondary battery according to an embodiment, a DCIR increase rate is significantly reduced, thereby exhibiting excellent battery characteristics, compared to a lithium secondary battery employing a general nickel-rich lithium-nickel composite oxide as a cathode active material.

The operating voltage of the lithium secondary battery to which the cathode, the anode, and the electrolyte are applied has a lower limit of 2.5 V to 2.8 V and an upper limit of 4.1 V or more, for example, 4.1 V to 4.45 V.

The lithium secondary battery may be used in power tools driven by an electric motor; electric vehicles (EVs) such as hybrid electric vehicles (HEVs), plug-in hybrid electric vehicles (PHEVs); electric two-wheeled vehicles such as electric bicycles (E-bikes) and electric scooters (E-scooters); electric golf carts; power storage systems; and the like, but the present disclosure is not limited thereto.

As used herein, the term "alkyl group" refers to a branched or unbranched aliphatic hydrocarbon group. In an embodiment, the alkyl group may be substituted or unsubstituted. Examples of the alkyl group includes, but are not limited to, a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group, each of which may be optionally substituted in other embodiments. In another embodiment, the alkyl group may have 1 to 6 carbon atoms. Examples of the alkyl group of 1 to 6 carbon atoms may include, but are not limited to, a methyl group, an ethyl group, a propyl group, an isopropyl group, a butyl group, an isobutyl group, a sec-butyl group, a pentyl group, a 3-pentyl group, and a hexyl group.

At least one hydrogen atom of the alkyl group may be substituted with a halogen atom, a C1-C20 alkyl group atom (for example, $CF_3$, $CHF_2$, $CH_2F$, $CCl_3$, or the like) substituted with a halogen, a C1-C20 alkoxy group, a C2-C20 alkoxyalkyl group, a hydroxyl group, a nitro group, a cyano group, an amino group, an amidino group, hydrazine, hydrazone, a carboxyl group or its salt, a sulfonyl group, a sulfamoyl group, a sulfonic acid group or its salt, a C1-C20 alkyl group, a C2-C20 alkenyl group, a C2-C20 alkynyl group, C1-a C20 heteroalkyl group, a C6-C20 aryl group, a C7-C20 arylalkyl group, a C6-C20 heteroaryl group, a C7-C20 heteroarylalkyl group, a C6-C20 heteroaryloxy group, or a C6-C20 heteroaryloxyalkyl group.

As used herein, the "alkenyl group" includes, but is not limited to, an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cyclopentenyl group, as a hydrocarbon group of 2 to 20 carbon atoms having at least one carbon-carbon double bond. In another embodiment, the alkenyl group may be substituted or unsubstituted. In another embodiment, the alkenyl group may have 2 to 40 carbon atoms.

As used herein, the term "alkynyl group" includes, but is not limited to, an ethynyl group, a 1-propynyl group, a 1-butynyl group, and a 2-butynyl group, as a hydrocarbon group of 2 to 20 carbon atoms having at least one carbon-carbon triple bond. In another embodiment, the alkynyl group may be substituted or unsubstituted. In another embodiment, the alkynyl group may have 2 to 40 carbon atoms.

As used herein, a substituent is derived from an unsubstituted parent group, wherein at least one hydrogen atom is substituted with another atom or functional group. Unless otherwise specified, when a functional group is considered to be "substituted," it means that the functional group is substituted with at least one substituent independently selected from the group consisting of a C1-C20 alkyl group, a C2-C20 alkenyl group, a C2-C20 alkynyl group, a C1-C20 alkoxy group, halogen, a cyano group, a hydroxy group, and a nitro group. When a functional group is described as being "optionally substituted", the functional group may be substituted with the aforementioned substituent.

The term "halogen" includes fluorine, bromine, chlorine, and iodine.

The "alkoxy" refers to "alkyl-O—", where alkyl is as defined above. Examples of the alkoxy group may include a methoxy group, an ethoxy group, a 2-propoxy group, a butoxy group, a t-butoxy group, and pentyloxy group, hexyloxy group. A least one hydrogen atom of the alkoxy group may be substituted with the same substituent as in the case of the above-described alkyl group.

"Heteroaryl" refers to a monocyclic or bicyclic organic group which contains one or more heteroatoms selected from N, O, P or S, and the remaining ring atoms of which are carbon. The heteroaryl group may include, for example, 1 to 5 heteroatoms, and may include 5 to 10 ring members. S or N may be oxidized to have various oxidation states.

Examples of heteroaryl may include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl group, 1,2,3-thiadiazolyl, 1,2,4-thiadiazolyl, 1,2,5-thiadiazolyl, 1, 3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazine-2-yl, pyrazin-4-yl, pyrazin-5-yl, 2-pyrimidin-2-yl, 4-pyrimidin-2-yl, and 5-pyrimidin-2-yl.

The term "heteroaryl" includes instances in which a heteroaromatic ring is optionally fused to one or more of aryl, cycloaliphatic, and heterocycle.

The term "carbocyclic" refers to a saturated or partially unsaturated non-aromatic monocyclic, bicyclic or tricyclic hydrocarbon group.

Examples of the monocyclic hydrocarbon group include cyclopentyl, cyclopentenyl, cyclohexyl, and cyclohexenyl.

Examples of the bicyclic hydrocarbon group may include bornyl, decahydronaphthyl, bicyclo [2.1.1] hexyl, bicyclo [2.1.1] heptyl (bicyclo) [2.2.1]heptyl), bicyclo[2.2.1]heptenyl, and bicyclo[2.2.2]octyl.

An example of the tricyclic hydrocarbon group may include adamantyl.

One or more hydrogen atoms in the carbon ring may be substituted with the same substituents as in the case of the above-described alkyl group.

The present disclosure will be described in more detail through the following examples and comparative examples. However, these examples are provided to illustrate the present disclosure, and the scope of the present disclosure is not limited thereto.

Pre-Preparation Example 1: Preparation of Compound of Formula 3

10 ml of an anhydrous dichloromethane solution of trimethylsilylimidazole (TCl) (0.05 mol, 9.44 g) was added dropwise to an anhydrous dichloromethane solution of trimethylsilyl chlorosulfonate (Sigma-Aldrich) (0.05 mol, 7.01 g) at 0° C. to obtain a reaction mixture.

The reaction mixture was stirred at room temperature (25° C.) for 1 hour. Then, a part of liquid in the reaction mixture was evaporated under reduced pressure to reduce the volume of a reaction product to about ⅓ of the initial volume of the reaction mixture. The remaining suspension was filtered to obtain a white precipitate, which was washed twice with anhydrous dichloromethane and washed once with 5 ml of anhydrous hexane. The resulting product was vacuum-dried for 24 hours to remove the remaining solvent to obtain the compound of Formula 3 as white powder.

Yield: 8.59 g (88%)

$^1$H NMR (400 MHz, CDCl3), δ 0.63 (s, 9H), 7.08 (s, $^1$H), 7.71 (s, $^1$H), 8.63 (s, $^1$H).

$^{13}$C NMR (100 MHz, CDCl3), δ −0.70 (s), 121.94 (s), 122.67 (s), 137.08 (s).

$^{29}$Si NMR (80 MHz, CDCl3), δ 26.86 (s).

Preparation Example 1: Preparation of Electrolyte 1.5 M of LiPF$_6$ was added to a mixed solvent having a volume ratio of ethylene carbonate (EC), ethylmethyl carbonate (EMC), and dimethyl carbonate (DMC) of 2:1:7, and then the compound of formula 3 obtained according to Pre-preparation Example 1 was added thereto to prepare an electrolyte for a lithium secondary battery.

The content of the compound of Formula 3 was about 0.1 wt % based on the total weight of the electrolyte.

<Formula 3>

Preparation Example 2: Preparation of Electrolyte

An electrolyte for lithium secondary batteries was prepared in the same manner as in Preparation Example 1, except that the content of the compound of Formula 3 was changed to about 0.5 wt % based on the total weight of the electrolyte.

Preparation Example 3: Preparation of Electrolyte

An electrolyte for lithium secondary batteries was prepared in the same manner as in Preparation Example 1, except that the content of the compound of Formula 3 was changed to about 1 wt % based on the total weight of the electrolyte.

Preparation Example 4: Preparation of Electrolyte

An electrolyte for lithium secondary batteries was prepared in the same manner as in Preparation Example 1, except that the content of the compound of Formula 3 was changed to about 2 wt % based on the total weight of the electrolyte.

Comparative Preparation Example 1: Preparation of Electrolyte

An electrolyte for lithium secondary batteries was prepared in the same manner as in Preparation Example 1, except that the compound of Formula 3 was not added.

Comparative Preparation Example 2: Preparation of Electrolyte

An electrolyte for lithium secondary batteries was prepared in the same manner as in Preparation Example 1, except that 1-(trimethylsilyl)imidazole was used instead of the compound of Formula 3.

Comparative Preparation Example 3: Preparation of Electrolyte

An electrolyte for lithium secondary batteries was prepared in the same manner as in Preparation Example 1, except that 1H-pyrazole-1-sulfonic acid was used instead of the compound of Formula 3.

Example 1: Manufacture of Lithium Secondary Battery 87 w % of graphite, 11 w % of a silicon carbon-based compound composite, 1 wt % of styrene-butadiene rubber (SBR) (ZEON), and 1.0 wt % of carboxymethyl cellulose (CMC, NIPPON A&L) were mixed, introduced in distilled water, and then stirred for 60 minutes using a mechanical stirrer to prepare an anode active material slurry. The slurry was applied to a thickness of about 60 μm onto a copper current collector having a thickness of 10 μm using a doctor blade, dried in a hot air dryer at 100° C. for 0.5 hours, dried once again under conditions of vacuum and 120° C. for 4 hours, and then roll-pressed to prepare an anode.

As the silicon carbon-based compound composite, a carbon-silicon composite (manufactured by BTR) including carbon-coated silicon particles was used.

97 wt % of $LiNi_{0.8}Co_{0.1}Al_{0.1}O_2$ (NCA), 0.5 wt % of artificial graphite (SFG6, Timcal) powder as a conductive material, 0.8 wt % of carbon black (Ketjenblack, ECP), 0.2 wt % of modified acrylonitrile rubber (BM-720H, Zeon Corporation), 1.2 wt % of polyvinylidene fluoride (PVdF, S6020, Solvay), and 0.3 wt % of polyvinylidene fluoride (PVdF, S5130, Solvay) are mixed, introduced in N-methyl-2-pyrrolidone, and then stirred for 30 minutes using a mechanical stirrer to prepare a cathode active material slurry. The slurry was applied to a thickness of about 60 μm onto an aluminum current collector having a thickness of 20 μm using a doctor blade, dried in a hot air dryer at 100° C. for 0.5 hours, dried once again under conditions of vacuum and 120° C. for 4 hours, and then roll-pressed to prepare a cathode.

A cylindrical lithium secondary battery was manufactured by using a polyethylene separator of a thickness of 14 μm in which ceramic was applied on the cathode as a separator and using the electrolyte prepared in Preparation Example 1 as an electrolyte.

Examples 2 to 4: Manufacture of Lithium Secondary Batteries

Lithium secondary batteries were manufactured in the same manner as in Example 1, except the electrolytes prepared according to Preparation Examples 2 to 4 were used respectively instead of the electrolyte prepared in Preparation Example 1.

Comparative Examples 1 to 3: Manufacture of Lithium Secondary Batteries

Lithium secondary batteries were manufactured in the same manner as in Example 1, except the electrolytes prepared according to Comparative Preparation Examples 1 to 3 were used respectively instead of the electrolyte prepared in Preparation Example 1.

Evaluation Example 1: Test of Initial Direct Current Resistance (DC-IR) at Room Temperature (25° C.) and Direct Current Resistance Increase Rate after Storage at High Temperature The lithium secondary batteries prepared in Examples 1 to 4 and Comparative Examples 1 to 3 were tested under a condition of 1 C/10 second discharge (SOC 100) at 25° C., and initial direct current resistances (DCIR) of the lithium secondary batteries were measured as a ΔV/ΔI (change in voltage/change in current) value before the lithium secondary batteries were stored in an oven at a high temperature of 60° C. Some of the results are shown in Table 1 and FIG. 2 below. Then, after measuring the initial direct current resistances (DCIR), direct current resistances after storage for 30 days at a high temperature (60° C.) were measured, and a DCIR increase rate (%) was calculated according to Equation 1 below.

Figure 2:
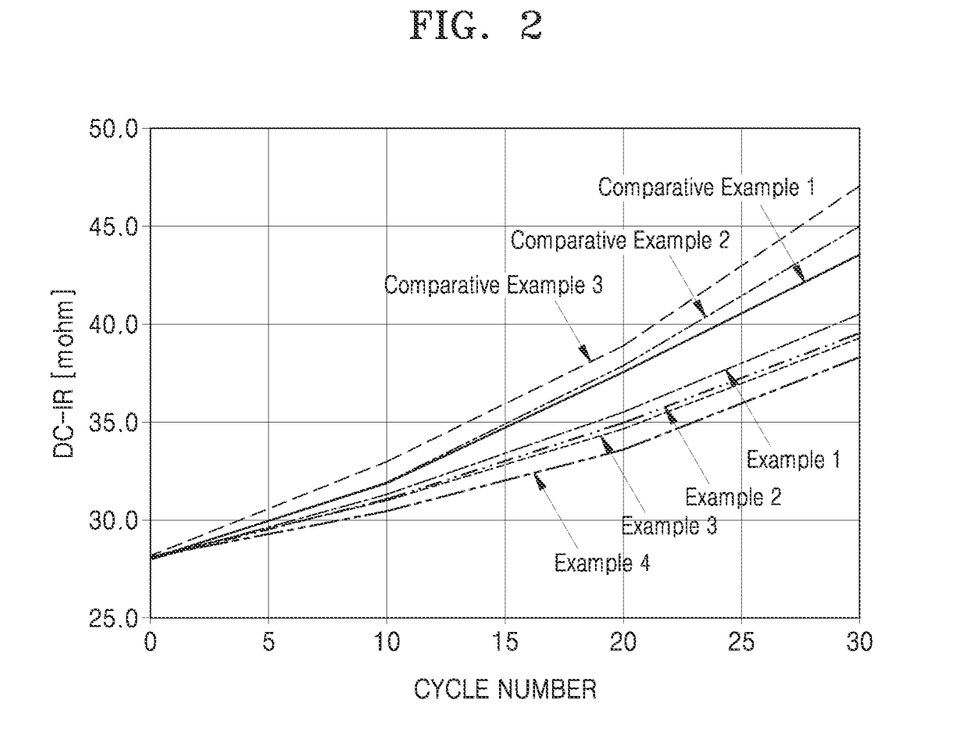
FIG. 2 is a graph showing high-temperature storage resistance characteristics of lithium secondary batteries according to Examples 1 to 4 and Comparative Examples 1 to 3.

DCIR increase rate=[DCIR(30d.)−DCIR(0d.)/DCIR(0d.)]×100%  [Equation 1]

When DCIR 1 C/10 sec discharge proceeds, voltage (V1) and current (I1) were measured at a start point, voltage (V2) and current (I2) were measured at a point of 10 sec, and a DCIR increase rate (%) was calculated by Equation (V1−V2)/(I2−I1).

The measurement results of direct current resistance increase rates are shown in Table 1 and FIG. 2 below.

TABLE 1

| Class. | Initial direct current resistance (DCIR) (mΩ) | DCIR (mΩ) after 30 days | DCIR increase rate (%) |
|---|---|---|---|
| Example 1 | 28.0 | 40.5 | 144.6 |
| Example 2 | 28.0 | 39.5 | 141.1 |
| Example 3 | 28.1 | 39.3 | 139.6 |
| Example 4 | 28.2 | 38.3 | 139.6 |
| Comparative Example 1 | 28.1 | 43.5 | 155.0 |
| Comparative Example 2 | 28.0 | 45 | 160.7 |
| Comparative Example 3 | 28.2 | 47 | 166.7 |

As shown in Table 1 and FIG. 2, it may be found that even when the lithium secondary batteries of Examples 1 to 4 were stored for a long time at high temperature, the high-temperature resistance increase rates thereof were remarkably low, compared to the lithium secondary batteries of Comparative Example 1 not containing the compound of Formula 3 and the lithium secondary batteries of Comparative Examples 2 and 3 containing other additives. This is because the compound of Formula 3 effectively acts as a scavenger of $PF_5$ to stabilize the lithium salt, and forms a stable film on the surface of the cathode to effectively inhibit side reactions between the cathode and the electrolyte. In Example 1, the compound of Formula 3 is used as an additive for electrolytes, wherein the compound of Formula 3 has an imidazole-$SO_3$—$Si(CH_3)_3$ structure and a structure in which an $SO_3$ moiety is directly bonded to nitrogen (N) of imidazole.

In contrast, in Comparative Example 2, 1-(trimethylsilyl) imidazole having a structure in which $Si(CH_3)_3$ is directly bonded to nitrogen of imidazole is used as an additive for electrolytes, and 1-(trimethylsilyl)imidazole has a structure in which $Si(CH_3)_3$ is directly bonded to nitrogen (N) of imidazole.

In Comparative Example 3, 1H pyrazole-1-sulfonic acid is used as an additive for electrolytes, and 1H pyrazole-1-sulfonic acid has a structure in which nitrogen (N) of pyrazole is connected to $SO_3H$ and, unlike the compound of Formula 3 of Example 1, there is no Si.

As described above, since 1-(trimethylsilyl)imidazole, which is the additive for electrolytes of Comparative Example 2, and 1H pyrazole-1-sulfonic acid, which is the additive for electrolytes of Comparative Example 3, have a very different structure from the compound of Formula 3 used in Example 1, the effect of using the additive for electrolytes of Example 1 could not be obtained only by using the additive for electrolytes of Comparative Example 2 or Comparative Example 3.

The invention claimed is:

1. An electrolyte for a lithium secondary battery, comprising:
 a lithium salt;
 a non-aqueous organic solvent; and
 an electrolyte additive comprising a compound represented by Formula 1:

<Formula 1> wherein, in Formula 1, $R_1$ to $R_3$ are each independently hydrogen, a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group, and $R_4$ to $R_6$ are each independently a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group.

2. The electrolyte of claim 1, wherein, in Formula 1, $R_1$ to $R_3$ are each independently: hydrogen; a substituted or unsubstituted $C_1$-$C_{30}$ alkyl group; a $C_1$-$C_{30}$ alkyl group substituted with one or more selected from the group consisting of a methyl group, an ethyl group, a propyl group, a butyl group, —F, —Cl, —Br, —I, a cyano group, a hydroxyl group, and a nitro group; or a $C_2$-$C_{30}$ alkenyl group substituted with one or more selected from the group consisting of a methyl group, an ethyl group, a propyl group, a butyl group, —F, —Cl, —Br, —I, a cyano group, a hydroxyl group, and a nitro group.

3. The electrolyte of claim 1, wherein, in Formula 1, $R_4$ to $R_6$ are each independently: a $C_1$-$C_{30}$ alkyl group; a $C_1$-$C_{30}$ alkyl group substituted with one or more selected from the group consisting of a methyl group, an ethyl group, a propyl group, a butyl group, —F, —Cl, —Br, —I, a cyano group, a hydroxyl group, and a nitro group; or a $C_2$-$C_{30}$ alkenyl group substituted with one or more selected from the group consisting of a methyl group, an ethyl group, a propyl group, a butyl group, —F, —Cl, —Br, —I, a cyano group, a hydroxyl group, and a nitro group.

4. The electrolyte of claim 1, wherein the compound represented by Formula 1 is a compound represented by Formula 2:

<Formula 2> wherein, in Formula 2, $R_4$ to $R_6$ are each independently a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group, and in Formula 2, at least one substituent of the substituted $C_1$-$C_{30}$ alkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group is at least one selected from the group consisting of a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

5. The electrolyte of claim 4, wherein, in Formula 2, $R_4$ to $R_6$ are each independently a $C_1$-$C_5$ alkyl group, a $C_2$-$C_5$ alkenyl group, or a $C_2$-$C_5$ alkenyl group substituted with a halogen.

6. The electrolyte of claim 1, wherein, the compound represented by Formula 1 is selected from compounds represented by Formulas 3 to 6:

<Formula 3>

<Formula 4> wherein in Formula 4, Ph is a phenyl group,

<Formula 5>

<Formula 6>

7. The electrolyte of claim 1, wherein a content of the electrolyte additive is in a range of 0.1 wt % to 10 wt % based on a total weight of the electrolyte.

8. The electrolyte of claim 1, wherein a content of the electrolyte additive is in a range of 0.5 wt % to 5 wt % based on a total weight of the electrolyte.

9. The electrolyte of claim 1, wherein the lithium salt is at least one selected from among $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LIN(SO_2CF_2CF_3)_2$, and compounds represented by Formulas 10 to 13:

[Formula 10]

10. The electrolyte of claim 9, wherein the electrolyte additive comprises a compound represented by Formula 2:

<Formula 2> in Formula 2, $R_4$ to $R_6$ each independently being a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group, and in Formula 2, at least one substituent of the substituted $C_1$-$C_{30}$ alkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group is at least one selected from the group consisting of a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

11. The electrolyte of claim 9, wherein the electrolyte additive is at least one compound selected from among Formulas 3 to 6:

<Formula 3>

<Formula 4>

<Formula 5>

<Formula 6> in Formula 4, Ph being a phenyl group.

12. The electrolyte of claim 1, wherein
the organic solvent includes at least one selected from the group consisting of ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethylformamide, dimethylacetamide, gamma-valerolactone, gamma-butyrolactone, and tetrahydrofuran.

13. The electrolyte of claim 1, wherein the electrolyte additive comprises a compound represented by Formula 2:

<Formula 2> in Formula 2, $R_4$ to $R_6$ each independently being a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group, and in Formula 2, at least one substituent of the substituted C1-C30 alkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group is at least one selected from the group consisting of a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

14. The electrolyte of claim 1, wherein the electrolyte additive is at least one compound selected from among Formulas 3 to 6:

<Formula 3>

<Formula 4>

<Formula 5>

<Formula 6> in Formula 4, Ph being a phenyl group.

15. A lithium secondary battery comprising:
a cathode including a cathode active material;
an anode including an anode active material; and
the electrolyte of claim 1 arranged between the cathode and the anode.

16. The lithium secondary battery of claim 15, wherein the cathode includes a lithium transition metal oxide represented by Formula 7:

$$Li_aNi_xCo_yM_zO_{2-b}A_b$$ <Formula 7> wherein, in Formula 7, $1.0 \leq a \leq 1.2$, $0 \leq b \leq 0.2$, $0.6 \leq x < 1$, $0 < y \leq 0.3$, $0 < z \leq 0.3$, $x+y+z=1$, M is at least one selected from the group consisting of manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B), and A is F, S, Cl, Br, or a combination thereof.

17. The lithium secondary battery of claim 15, wherein the cathode includes a lithium transition metal oxide represented by Formula 8 or 9:

$$LiNi_xCo_yMn_zO_2$$ <Formula 8> wherein in Formula 8, $0.6 \leq x \leq 0.95$, $0 < y \leq 0.2$, and $0 < z \leq 0.1$, $$LiNi_xCo_yAl_zO_2$$ <Formula 9> and in Formula 9, $0.65 \leq x \leq 0.95$, $0 < y \leq 0.2$, and $0 < z \leq 0.1$.

18. The lithium secondary battery of claim 15, wherein the electrolyte comprises an electrolyte additive comprising a compound represented by Formula 2:

<Formula 2> in Formula 2, $R_4$ to $R_6$ each independently being a substituted or unsubstituted $C_1$-$C_{30}$ alkyl group, a substituted or unsubstituted $C_4$-$C_{30}$ carbocyclic group, a substituted or unsubstituted $C_6$-$C_{30}$ aryl group, a substituted or unsubstituted $C_2$-$C_{30}$ alkenyl group, a substituted or unsubstituted $C_2$-$C_{30}$ alkynyl group, or a substituted or unsubstituted $C_2$-$C_{30}$ heteroaryl group, and in Formula 2, at least one substituent of the substituted $C_1$-C30 alkyl group, the substituted $C_4$-$C_{30}$ carbocyclic group, the substituted $C_6$-$C_{30}$ aryl group, the substituted $C_2$-$C_{30}$ alkenyl group, the substituted $C_2$-$C_{30}$ alkynyl group, or the substituted $C_2$-$C_{30}$ heteroaryl group is at least one selected from the group consisting of a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

19. The lithium secondary battery of claim 15, wherein the electrolyte comprises an electrolyte additive comprising at least one compound selected from among Formulas 3 to 6:

<Formula 3>

<Formula 4>

<Formula 5>

<Formula 6> in Formula 4, Ph being a phenyl group.

* * * * *

UNITED STATES PATENT AND TRADEMARK OFFICE
CERTIFICATE OF CORRECTION

PATENT NO. : 12,218,309 B2
APPLICATION NO. : 17/630120
DATED : February 4, 2025
INVENTOR(S) : Jinhyeok Lim et al.

It is certified that error appears in the above-identified patent and that said Letters Patent is hereby corrected as shown below:

In the Claims

In Column 22, Line 57, in Claim 9, delete "LIN(SO$_2$CF$_2$CF$_3$)$_2$," and insert -- LiN(SO$_2$CF$_2$CF$_3$)$_2$, --.

In Column 24, Line 45, in Claim 13, delete "C1-C30" and insert -- C$_1$-C$_{30}$ --.

In Column 25, Line 38, in Claim 17, delete "0.65≤x" and insert -- 0.6≤x --.

In Column 26, Line 11, in Claim 18, delete "C$_1$-C30" and insert -- C$_1$-C$_{30}$ --.

Signed and Sealed this
Sixteenth Day of September, 2025

Coke Morgan Stewart
*Acting Director of the United States Patent and Trademark Office*